June 3, 1930. F. J. SENG 1,761,314
SHOCK FORMING MACHINE
Filed April 24, 1928 3 Sheets-Sheet 1
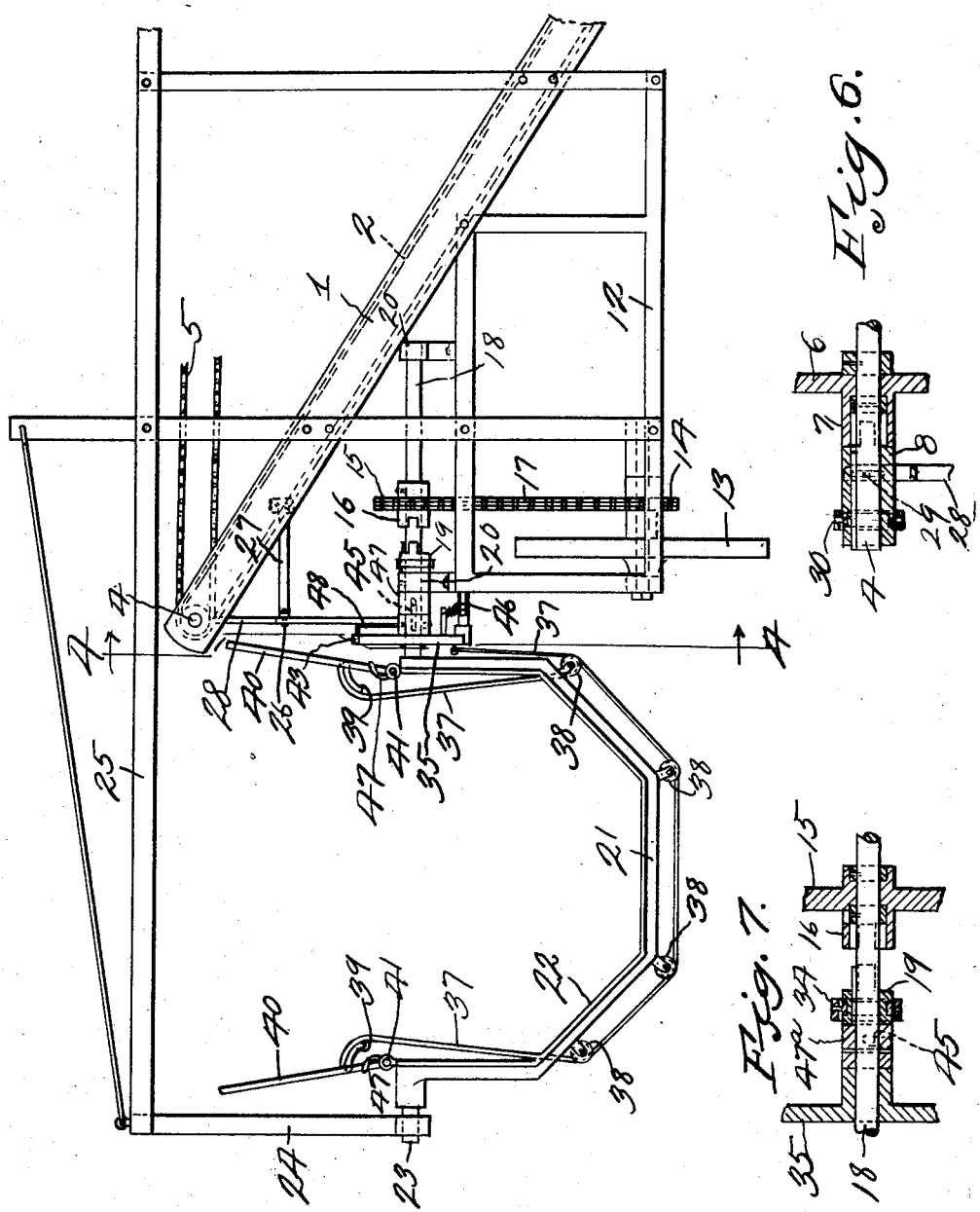

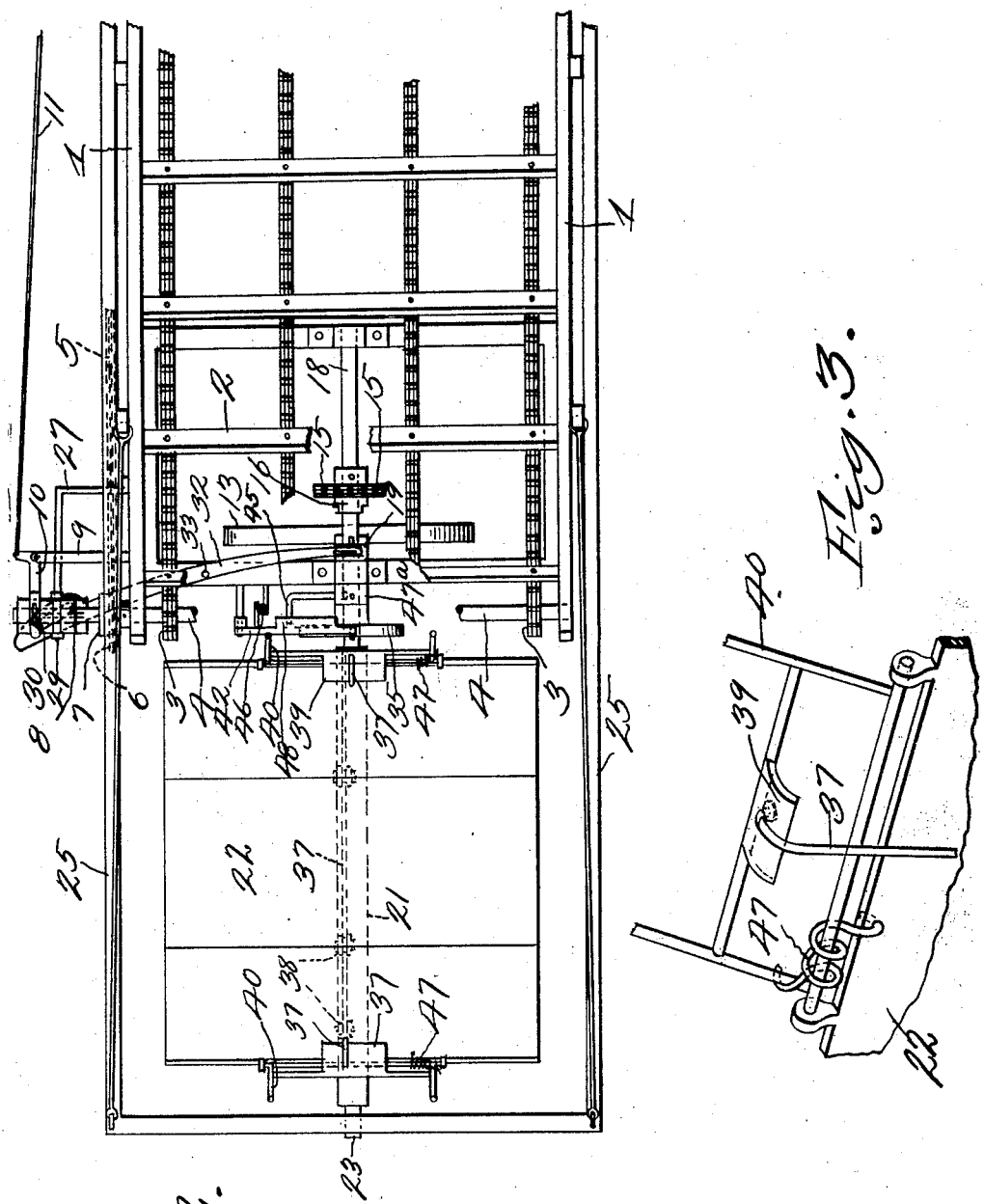

June 3, 1930.　　　　F. J. SENG　　　　1,761,314
SHOCK FORMING MACHINE
Filed April 24, 1928　　　3 Sheets-Sheet 3
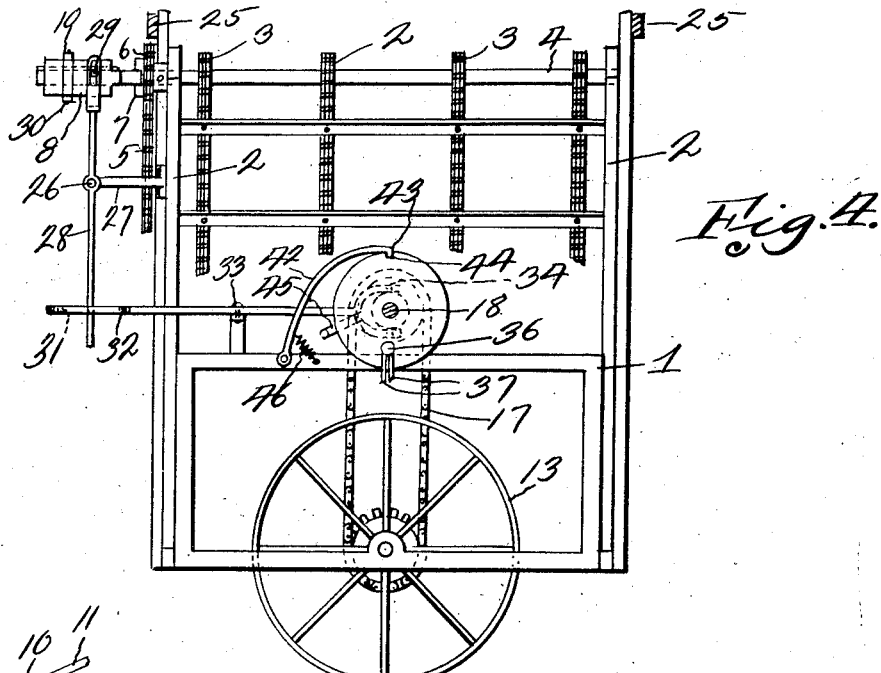
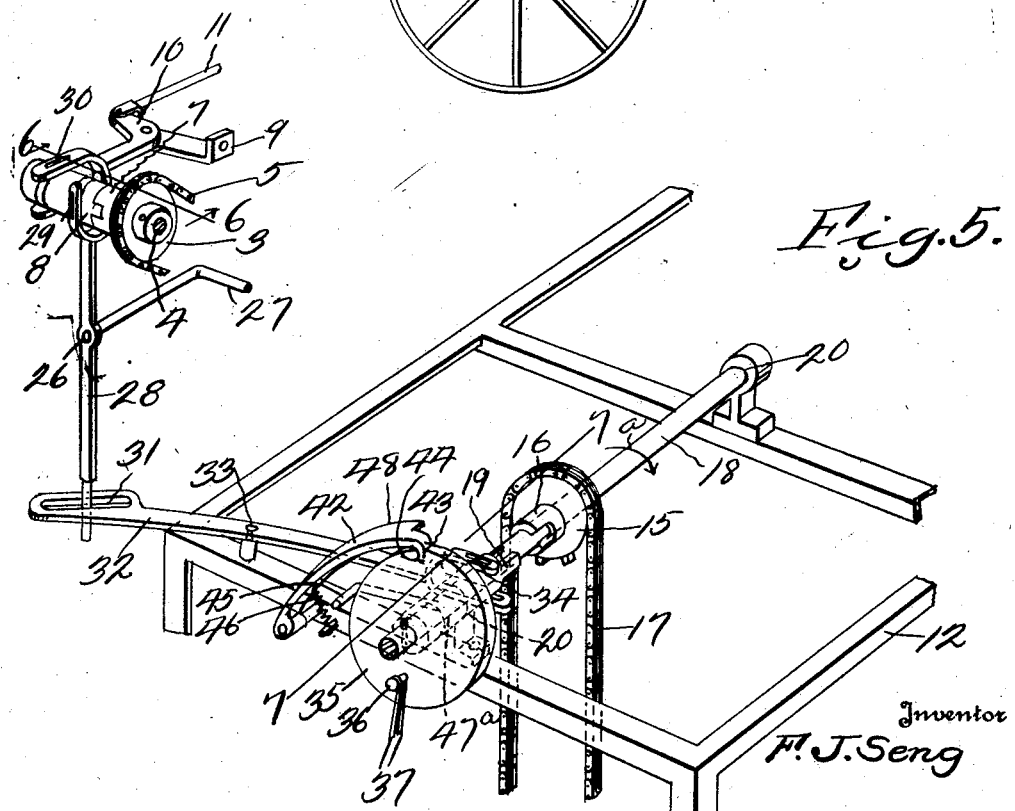

Patented June 3, 1930

1,761,314

UNITED STATES PATENT OFFICE

FRED J. SENG, OF NEW ALBANY, INDIANA

SHOCK-FORMING MACHINE

Application filed April 24, 1928. Serial No. 272,395.

The invention relates to shock forming machines used in connection with harvesters, and has for its object to provide rearwardly of the discharge conveyor of the harvester a transversely disposed hopper, pivotally mounted, into which the sheaves are discharged by the discharge conveyor, and means whereby at the option of the operator the discharge conveyor may be stopped and the hopper pivotally moved for depositing the sheaves on the ground with their butts downwardly, whereby the shock is formed, and it will only be necessary for a band to be placed around the shock.

A further object is to provide independent driving means for the conveyor and for the shock forming device, clutch means for controlling the conveyor and the driving means for the shock forming means and connections between both clutch means whereby when one clutch means is in operative position, the other clutch means is in declutched position.

A further object is to provide pivoted sheaf holding members at opposite sides of the hopper and normally held in open position by spring means, and cable means whereby upon rotation of the hopper said pivoted members will be forced downwardly for gripping the sheaves within the hopper upon initial pivotal movement of the hopper, and means for releasing said cable when the hopper reaches a vertical position whereby the sheaves are released and allowed to be deposited upon the ground.

A further object is to provide a shock forming hopper having a horizontally disposed operating shaft on which is pivotally mounted a disc, with a notch in which a detent arm engages, cable connections between the disc and pivoted sheaf gripping arms carried by the hopper, an idle clutch element on said shaft, a trip arm rotatable with the shaft in the path of the detent arm, clutch means for locking the first clutch to the shaft, ground operated driving connections with the first clutch element, said trip arm being positioned whereby upon the hopper reaching a vertical discharge position, the detent arm will release the disc and allow the sheaf holding members to be forced to open positions by springs carried thereby. Also to position the detent whereby upon the continued rotation of the shaft and hopper, it will be again received within the notch of the disc.

A further object is to provide a spring cooperating with the detent arm whereby its nose is normally forced towards the periphery of the disc.

A further object is to provide the conveyor clutch with a downwardly extending pivoted arm, the lower end of which extends through a slot of a horizontally disposed pivoted arm controlling the clutch of the hopper operating mechanism and forming means whereby when the conveyor clutch is in clutched relation the hopper clutch is in declutched relation and vice versa.

With the above and other objects in view the invention resides in the combination and arrangement of parts as hereinafter set forth, shown in the drawings, described and claimed, it being understood that changes in the precise embodiment of the invention may be made within the scope of what is claimed without departing from the spirit of the invention.

In the drawings:

Figure 1 is a side elevation of the rear end of the discharge conveyor of a conventional form of harvester, showing the shocking mechanism applied thereto.

Figure 2 is a top plan view of the harvester conveyor and shock forming device.

Figure 3 is a perspective view of one side of the hopper showing the pivoted gripping member.

Figure 4 is a transverse sectional view taken on line 4—4 of Figure 1.

Figure 5 is a perspective view of the hopper operating mechanism and the control mechanism of the conveyor.

Figure 6 is a vertical longitudinal sectional view through the conveyor control clutch, taken on line 6—6 of Figure 5.

Figure 7 is a vertical longitudinal sectional view taken on line 7—7 of Figure 5.

Referring to the drawings, the numeral 1 designates the side bars of an upwardly and outwardly extending discharge conveyor of the usual type used in connection with harvesters, and which conveyor is adapted to discharge sheaves onto the ground to the side of the harvester. It has been found that where the sheaves are miscellaneously deposited it is necessary to have a gang of workmen to follow the machine to pick up the sheaves and form the same into shocks, and then place bands around the same, and to obviate this difficulty the mechanism hereinafter described collects the sheaves until there are sufficient sheaves to form a shock, then they are deposited on the ground in shocks ready for banding. The sheaves are elevated by an endless conveyor 2 between the bars 1, and which conveyor extends over sprockets 3 carried by a transversely disposed rotatable shaft 4. The endless conveyor 2 is driven by a sprocket chain 5, which extends over a sprocket 6, rotatably mounted on the shaft 4 and provided with a clutch element 7, with which clutch element a slidably keyed clutch element 8 cooperates. The clutch element 8 rotates with the shaft 4 and it will be noted that when the elements are in the position shown in Figure 5, the conveyor operating shaft 4 will be rotated. The sprocket chain 5 extends to any movable part of the harvester for obtaining power incident to the operation of the harvester. Pivotally mounted on a bracket 9 extending outwardly from one of the bars 1 is a bell crank lever 10, to which is connected a control rod 11, which leads to the harvester and preferably to a position within easy reach of the operator, whereby the operator can control the operation of the discharge conveyor 2 at will. The above control is designed whereby the operator stops the discharge of sheaves when the shocking mechanism is in operation.

Suspended beneath the conveyor is a frame 12, which frame is provided with a ground engaging wheel 13 having a sprocket 14, and extending over said sprocket and over a sprocket 15 carried by the clutch member 16 is a sprocket chain 17. The clutch member 16 is rotatably mounted on a shaft 18, and does not rotate until the same is locked to rotate therewith by the slidable clutch element 19 slidably mounted on the shaft. However when the slidable clutch element 19 is moved into clutch relation with the clutch 16, power from the ground engaging wheel 13 will be imparted to the shaft 18 for rotating the same. The shaft 18 is rotatably mounted in bearings 20 carried by the frame 12, and extends outwardly beneath the conveyor and has its outer end provided with a U-shaped member 21 arching the under side of the U-shaped hopper 22 and terminates in a pintle 23 in axial alinement with the shaft 18, and rotatably mounted in a bearing of the downwardly extending frame 24 carried by the horizontally disposed frame 25 above the conveyor and hopper, and of sufficient height and width whereby it will not interfere with the hopper 22 making a complete revolution. Pivotally mounted at 26 on a bracket 27, carried by the conveyor bar, is a vertically disposed rocker bar 28, the upper end of which is connected at 29 to the slidable clutch element 8, therefore it will be seen that when the bell crank lever, which is connected at 30 to the slidable clutch element 8 is moved in either direction, the bar 8 will be oscillated. The lower end of the bar 28 extends loosely through an elongated slot 31 in a horizontally disposed lever 32, which lever is pivotally mounted at 33 on the frame 12 and is provided with a conventional yoke connection 34 to the clutch element 19, and it will be noted that the slot 31 is positioned whereby when the clutch element 8 is moved outwardly the conveyor will be stopped and the shaft 18 rotated.

Rotatably mounted on the shaft 18 is a disc 35, which disc has connected thereto at 36 adjacent its lower side, cables 37. The cables 37 extend downwardly over the pulleys 38 carried by the U-shaped bar 1, and thence upwardly through the hopper 22 and over the curved plates 39 carried by the pivoted gripping members 40, which are pivotally connected at 41 to opposite sides of the hopper. By providing the plates 39, it is obvious that when the members 30 are in their raised positions as shown in Figure 1, the downward pulls on the cables 37 will be to the inside of the pivotal points 41, thereby insuring a positive gripping of the members 40 on sheaves within the hopper and operation of the members 40. In operation, when the operator decides to deposit the accumulated sheaves on the ground with their butts downwardly, he declutches the clutch elements 7 and 8 which will stop the conveyor 2, thereby stopping the feeding of sheaves from the machine to the hopper. Upon the declutching operation of elements 7 and 8, clutch elements 19 and 16 are immediately thrown into clutched relation whereby the shaft 18 will be rotated in the direction of the arrow $a$, Figure 5. However, the disc 35 is rotatably mounted on the shaft 18 and is normally held in the position shown in Figure 5 by the pivoted detent 42 having its nose 43 in the recess 44 in the upper side thereof, therefore it will be seen that as the shaft 18 rotates to rotate the hopper to a vertical position, the disc 35 is held against rotation, consequently pulls are imparted on the cables 37. After the hopper 22 reaches its vertical position for depositing the sheaves on the ground, the arm 45 raises the detent 42 against the action of the spring 46, thereby releasing the disc 35 and allowing the same to rotate on the shaft 18 under the influence of the springs 47 carried by the pivoted members 40.

After the springs 47, at the completion of the quarter rotation of the shaft 18, have forced the members 40 to their open position, said members 40 will impart pulls on the cables 37, thereby rotating the disc 35 to a position where the cables 37 will be substantially radially disposed, and said disc, during the continued rotation of the hopper, will remain in said relation. Immediately after the depositing operation, it will be noted the hopper being underslung as shown in Figure 1, will quickly rise during its continued rotation for clearing the upper end of the shock that is formed, thereby obviating any possibility of the hopper turning the shock over after it is formed. As the hopper continues its rotation for completing its operation, the nose 43 of the spring actuated detent 42 will drop into the recess 44 of the disc 35 and hold said disc, and at which time the operator throws the clutch elements 7 and 8 into clutched relation for operating the elevating conveyor 2, and which operation will simultaneously declutch the clutch elements 19 from the clutch elements 16, thereby stopping the operation of the shocker. The trip finger 45 is carried by a collar 47ᵃ mounted on the shaft 18 and rotates therewith, and it will be noted that the detent 42 is provided with a side lip 48 in the path of the finger whereby said finger will not be in the path of the nose 43 of the detent during the operation.

From the above it will be seen that a shock forming device is provided which may be attached to the discharge conveyor of a conventional form of harvester, and that sheaves will be collected therein until there are sufficient sheaves to form a shock, and at which time the operator through manipulation of a single control stop the operation of the discharge conveyor, simultaneously start the discharge of the shock on the ground, where a single operator may band the shocks.

The invention having been set forth what is claimed as new and useful is:

1. The combination with the discharge end of a harvester conveyor, of a shocker disposed below said discharge end and into which sheaves are discharged, means for controlling the operation of a discharge conveyor, of a shaft rotatably mounted beneath the conveyor and supporting the shocker, a ground engaging wheel, clutch controlled connections between the ground engaging wheel and the shaft, connections between said last named clutch connections and the conveyor control mechanism whereby upon stopping of the conveyor, the clutch connection will be moved to clutched position and the shaft rotated, a disc rotatably mounted on said shaft, pivoted gripping members carried by the shocker, cable connections between the gripping members and the disc to one side of the center of the disc, detent means for holding the disc against rotation until the shocker reaches a vertical discharge position, an arm carried by said shaft and cooperating with said detent for releasing the same, said pivoted members carried by the shocker having means for imparting pulls on the cables for rotating the disc to initial position.

2. The combination with the discharge end of a harvester conveyor, of a shocker, said shocker comprising a rotatable shaft, a hopper carried by said shaft and into which sheaves are discharged, a disc rotatably mounted on said shaft, pivoted gripping members carried by the hopper at opposite sides thereof, spring means for normally maintaining said gripping members in opened position, cables connecting said gripping members and the disc and anchored to one side of the center of the disc, a detent cooperating with the recess in said disc whereby said disc is prevented against rotation upon initial rotation of the shaft, means for rotating said shaft, an arm carried by said shaft in the path of the detent and positioned whereby upon a partial rotation of the shaft, the detent will be moved out of engagement with the disc and the disc allowed to rotate under the influence of the gripping members and the cables and means for controlling the operation of the shaft.

3. The combination with a discharge conveyor of a harvester, a shocker hopper beneath said conveyor, a rotatable shaft carried by said hopper, means for rotating said shaft as desired, pivoted spring actuated gripping members carried by the hopper at opposite sides thereof and normally maintained open, a disc rotatably mounted on the shaft, cable connections between the disc to one side of the center and the pivoted gripping members, a spring actuated detent cooperating with the recess in the disc and holding the same against rotation upon initial rotation of the shaft, an arm carried by the shaft in the path of the detent and positioned whereby upon initial rotation of the shaft it will move into engagement with the detent and release the disc, said disc upon the further rotation of the shaft being returned to normal position by the spring actuated gripping members.

4. The combination with the discharge end of a harvester discharge conveyor, a shock former beneath said discharge end, means for operating the conveyor from the discharge end thereof, clutch means for controlling the operation of said conveyor, a ground engaging wheel, cultch controlled driving connection between the ground engaging wheel and the shocker, of lever connections between the conveyor control clutch means and the shocker control clutch means whereby when one of said clutch means is in clutched relation the other clutch means is in declutched relation.

5. The combination with a harvester shocker comprising a hopper, a rotatable shaft carried by said hopper, said hopper being underslung in relation to said shaft, a harvester discharge conveyor, clutch means for operating said conveyor, clutch controlled means for operating the shocker shaft, gripping means carried by the hopper, lever connections between the clutch means of the shocker and conveyor whereby when one of the clutch means is in clutched relation the other is in declutched relation, pivoted sheaf gripping members carried by the hopper and means carried by the shaft and having cable connections with the gripping members whereby upon initial rotation of the shaft said gripping members will be moved to closed position and means cooperating with the gripping members whereby the gripping members will be moved to open position after the initial movement of the hopper.

6. A harvester shocker comprising a rotatable shaft, means for rotating said shaft, clutch means for controlling the rotation of the shaft, an underslung hopper carried by said shaft, pivoted gripping members carried by opposite sides of the hopper, spring means for normally forcing said gripping members to open positions, cables connected to said gripping members, and means for imparting pulls on said cables upon initial rotation of the shaft and releasing said cables upon continued rotation of the shaft.

In testimony whereof I hereunto affix my signature.

FRED J. SENG.